United States Patent
Kim et al.

(10) Patent No.: US 10,125,826 B2
(45) Date of Patent: Nov. 13, 2018

(54) CREEP CONTROL METHOD FOR VEHICLE

(71) Applicant: Hyundai Motor Company, Seoul (KR)

(72) Inventors: Jin Sung Kim, Hwaseong-si (KR); Sang Mo Ha, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 161 days.

(21) Appl. No.: 15/331,286

(22) Filed: Oct. 21, 2016

(65) Prior Publication Data

US 2017/0335904 A1    Nov. 23, 2017

(30) Foreign Application Priority Data

May 20, 2016    (KR) ......................... 10-2016-0062262

(51) Int. Cl.
  *F16D 48/06*    (2006.01)
  *F16H 63/46*    (2006.01)
  *B60W 10/02*    (2006.01)
  *B60W 30/18*    (2012.01)
  (Continued)

(52) U.S. Cl.
  CPC .............. *F16D 48/06* (2013.01); *F16H 63/46* (2013.01); *B60W 10/02* (2013.01);
  (Continued)

(58) Field of Classification Search
  CPC .. Y10T 477/753; Y10T 477/78; B60W 10/02; B60W 30/18063;
  (Continued)

(56) References Cited

U.S. PATENT DOCUMENTS 5,275,267 A * 1/1994 Slicker ................. F16D 48/066
                                                          192/103 R
5,759,131 A * 6/1998 Kosik ................... F16D 48/066
                                                          477/84
(Continued)

FOREIGN PATENT DOCUMENTS

JP    2003314593 A  * 11/2003    ........... F16D 48/064
JP    2005-161897 A    6/2005
(Continued)

OTHER PUBLICATIONS

English translation of JP 2003314593A; http://www.translationportal.epo.org; Aug. 10, 2018 (Year: 2018).*
(Continued)

*Primary Examiner* — Roger L Pang
(74) *Attorney, Agent, or Firm* — Brinks Gilson & Lione

(57) ABSTRACT

A creep control method for a vehicle is disclosed. The creep control method includes a limit-setting step and a limit release step. In the limit-setting step, a controller compares a speed of an input shaft of a transmission with a predetermined creep reference speed, and, if it is determined that the speed of the input shaft is lower than the creep reference speed, a creep minimum torque of a clutch for controlling creep driving of the vehicle is set to be a predetermined lower limit torque, which is larger than 0. In the limit release step, if the controller determines that the speed of the input shaft is increased above the creep reference speed while the creep minimum torque is limited to the lower limit torque, the creep minimum torque is set to 0.

6 Claims, 4 Drawing Sheets

(52) U.S. Cl.
CPC ............ *B60W 30/18063* (2013.01); *B60W 2510/1015* (2013.01); *B60W 2710/027* (2013.01); *F16D 2500/10412* (2013.01); *F16D 2500/30415* (2013.01); *F16D 2500/50206* (2013.01); *Y10T 477/753* (2015.01); *Y10T 477/78* (2015.01)

(58) Field of Classification Search
CPC ..... B60W 2510/1015; B60W 2710/027; F16D 48/06; F16D 2500/30415; F16D 2500/50206; F16D 2500/10412
See application file for complete search history.

(56) References Cited

U.S. PATENT DOCUMENTS

| | | | |
|---|---|---|---|
| 7,803,087 B2* | 9/2010 | Okubo | B60K 6/445 477/4 |
| 8,260,513 B2* | 9/2012 | Shelton | B60W 10/02 701/68 |
| 9,821,658 B1* | 11/2017 | Kim | B60K 31/00 |
| 2004/0058778 A1* | 3/2004 | Wheeler | B60W 10/02 477/71 |

FOREIGN PATENT DOCUMENTS

| | | |
|---|---|---|
| JP | 4034089 B2 | 1/2008 |
| JP | 2016-044625 A | 4/2016 |
| KR | 10-2014-0039811 A | 4/2014 |
| KR | 10-1510015 B1 | 4/2015 |

OTHER PUBLICATIONS

Korean Office Action dated Sep. 19, 2017 form the corresponding Korean Application No. 10-2016-0062262, 5 pp.

* cited by examiner

CREEP CONTROL METHOD FOR VEHICLE

CROSS-REFERENCE TO RELATED APPLICATION

This application claims the priority to and the benefit of Korean Patent Application No. 10-2016-0062262, filed on May 20, 2016, which is incorporated herein by reference in its entirety.

FIELD

The present disclosure relates to a driving control method for a vehicle, and more particularly, to a creep control method for a vehicle.

BACKGROUND

The statements in this section merely provide background information related to the present disclosure and may not constitute prior art.

In general, vehicles, which are constituted such that power from an engine is transmitted to an automated manual transmission (AMT) or a dual clutch transmission (DCT) via a dry clutch, have no damping component such as, for example, a torque converter. Thus, if the dry clutch is not properly controlled, a shock may occur, which highly affects the quality of the driving experience.

When a driver steps on an accelerator pedal during creep driving of the vehicle, the driving mode is converted into a launch mode. At this time, the dry clutch (hereinafter, simply referred to as a "clutch") moves through a touch point for engagement. However, there may occur a problem that the vehicle jerks and a shock is generated due to an inaccurate position of the touch point.

Of course, at the time of a driver's tip-in manipulation, as described above, in which the driver starts to step on the accelerator pedal during the creep driving, it may be possible to reduce operational sensitivity by making the clutch move more slowly through the touch point for engagement, to thereby reduce a shock. However, we have discovered that there is a shortcoming in that acceleration response is deteriorated.

The information disclosed in this Background of the Present disclosure section is only for enhancement of understanding of the general background of the present disclosure and should not be taken as an acknowledgement or any form of suggestion that this information forms the prior art already known to a person skilled in the art.

SUMMARY

The present disclosure provides a creep control method for a vehicle, which is capable of reducing or inhibiting the generation of a shock attributable to a clutch and improving acceleration response of the vehicle at the time of a driver's tip-in manipulation during creep driving of the vehicle.

In accordance with one form of the present disclosure, a creep control method for a vehicle includes: comparing a speed of an input shaft of a transmission with a predetermined creep reference speed through a controller, and, upon determining that the speed of the input shaft is lower than the creep reference speed, setting a creep minimum torque of a clutch for controlling creep driving of the vehicle to be a predetermined lower limit torque, the lower limit torque being larger than 0; and upon determining that the speed of the input shaft is increased above the creep reference speed while the creep minimum torque is limited to the lower limit torque, setting the creep minimum torque to 0.

The lower limit torque may be set to be in a range larger than 0 but incapable of accelerating the vehicle on level ground.

When the controller initiates a control process, upon determining that the speed of the input shaft is equal to or larger than the creep reference speed, the controller may perform the setting the creep minimum torque to 0, and upon determining that the speed of the input shaft is lower than the creep reference speed, the controller may perform the setting the creep minimum torque to be the lower limit torque, and upon determining that the speed of the input shaft is decreased below the creep reference speed while the creep minimum torque is set to 0, the controller may perform the setting the creep minimum torque to be the lower limit torque.

The creep reference speed may be set by subtracting a predetermined marginal speed from an engine target idle speed.

In accordance with another aspect of the present disclosure, a creep control method for a vehicle includes: upon determining that a vehicle speed is lower than a creep target vehicle speed through a controller, setting a creep minimum torque of a clutch for controlling creep driving of the vehicle to be a predetermined lower limit torque, the lower limit torque being larger than 0; and upon determining that the vehicle speed is increased above the creep target vehicle speed through the controller while the creep minimum torque is limited to the lower limit torque, setting the creep minimum torque to 0.

The lower limit torque may be set to be in a range larger than 0 but incapable of accelerating the vehicle on level ground.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
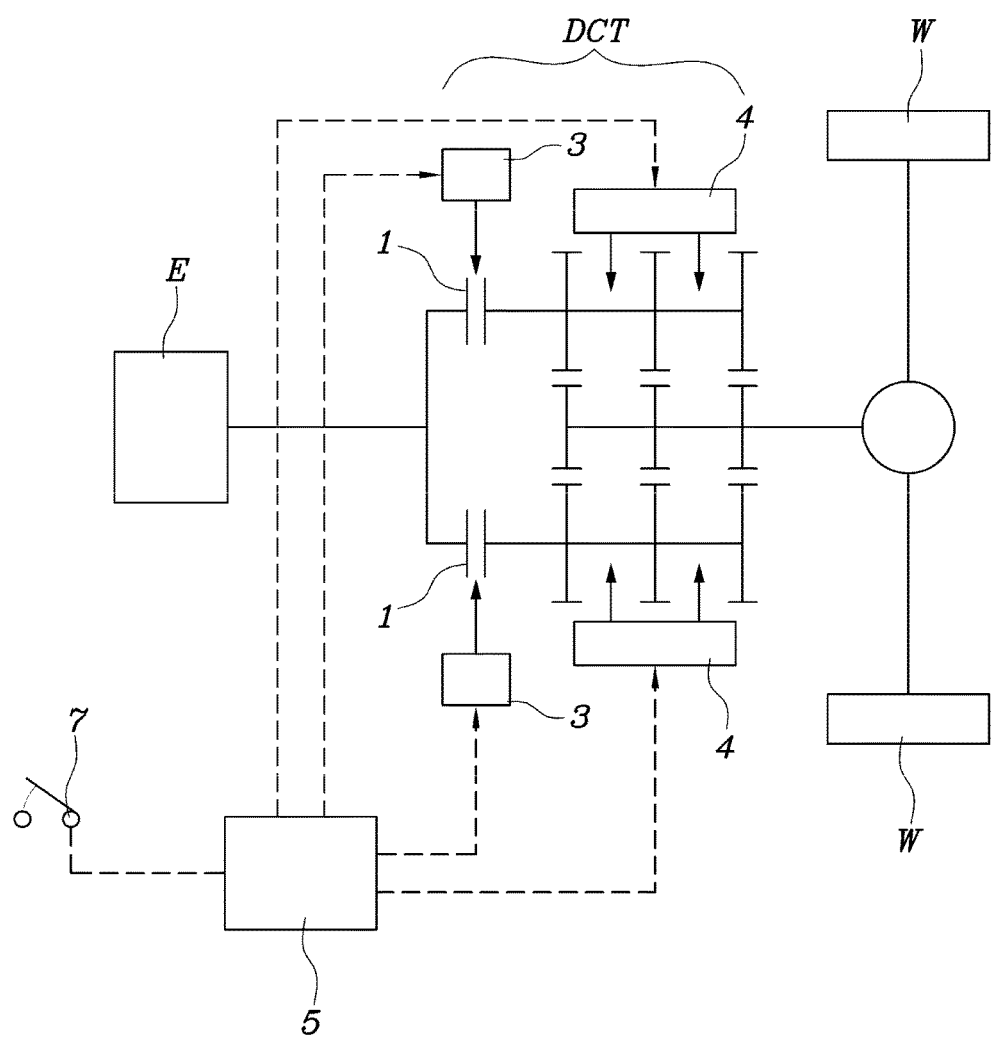
FIG. 1 is a constitutional view of the power train of the vehicle to which the present disclosure is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view illustrating the power train of the vehicle to which the present disclosure may be applied. The power from an engine E is transmitted to driving wheels W via a dual clutch transmission (DCT). Two clutches 1, which constitute the DCT, are controlled by respective clutch actuators 3. Transmission gears, which form respective gear shift stages, are shifted by gear shift actuators 4, which are configured to selectively drive synchronization devices. The clutch actuators 3 and the gear shift actuators 4 are controlled by a controller 5. The controller 5 is configured to receive a signal from an accelerator position sensor (APS) 7, which corresponds to the degree to which the accelerator pedal is depressed.

Of course, the controller 5 is configured to additionally receive information of an engine torque, an engine speed, etc.

Here, so long as no separate prefix is added to the term "controller", the term "controller" is a transmission controller for controlling a transmission such as, for example, a DCT. On the other hand, a controller for controlling the engine will be referred to as an "engine controller" in order to distinguish it from the transmission controller.

Figure 2:
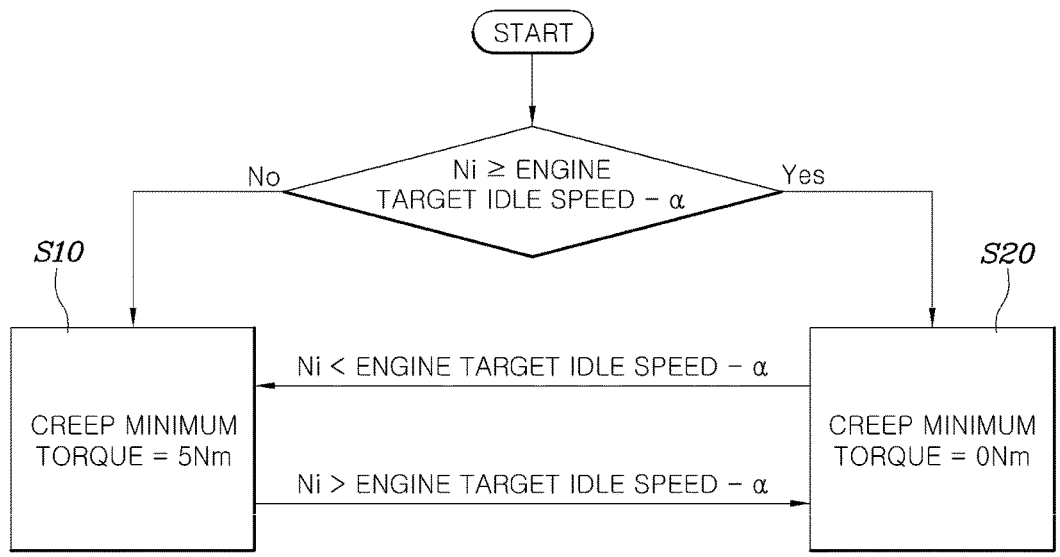
FIG. 2 is a flowchart explaining a creep control method for a vehicle according to the present disclosure.

Referring to FIG. 2, one form of the creep control method for a vehicle according to the present disclosure may include: a limit-setting step (S10), in which the controller 5 compares a speed Ni of an input shaft of the transmission with a predetermined creep reference speed, and, if it is determined that the speed of the input shaft is lower than the creep reference speed, a creep minimum torque of the clutch for controlling the creep driving of the vehicle is set to be a predetermined lower limit torque, which is larger than 0; and a limit release step (S20), in which, if the controller determines that the speed of the input shaft is increased above the creep reference speed while the creep minimum torque is limited to the lower limit torque, the creep minimum torque is set to 0.

In detail, when the speed Ni of the input shaft is lower than the creep reference speed, the creep minimum torque, which is the minimum clutch transmission torque for the creep driving of the vehicle, is set to be the lower limit torque, which is larger than 0. Accordingly, the clutch is not fully disengaged, but is maintained in the engaged state at a distance beyond the touch point. In the situation in which the clutch must be instantly engaged due to the driver's sudden tip-in manipulation, the transmission torque of the clutch may be immediately increased without moving the clutch through the touch point. As a result, the instant engagement of the clutch may improve acceleration response, and may inhibit or prevent shock generation attributable to inaccurate position of the touch point.

For reference, in the case of the DCT illustrated in FIG. 1, the speed of the input shaft of the transmission is a speed of the input shaft, to which the transmission gears are coupled so as to transmit driving force to the driving wheels.

The lower limit torque in the limit-setting step (S10) is set to be in the range larger than 0 but incapable of accelerating the vehicle on level ground. That is, the lower limit torque may be set to be a relatively low value, for example, 5 Nm, which cannot actually accelerate the vehicle or change the movement of the vehicle in spite of the engagement of the clutch at a distance beyond the touch point, but which can keep the creep driving of the vehicle stable even when the clutch transmission torque does not fall below the lower limit torque by the limit-setting step (S10) during the creep driving.

The creep reference speed is set by subtracting a predetermined marginal speed a from the engine target idle speed.

When the driver does not step on the accelerator pedal and thus the signal value from the APS is 0, the engine is controlled according to the engine target idle speed, which is decided by the engine controller in order to maintain the operating state of the engine. In this state, if the driver does not step on the brake pedal, the controller transmits the driving force desired for creep driving to the driving wheels in the form of the clutch transmission torque, which is transmitted through clutch slip control, thereby controlling the creep driving of the vehicle so that the vehicle creeps at a speed of approximately 5 Kph.

In the clutch slip control for the above-described creep driving of the vehicle, when the speed of the input shaft of the transmission is increased by the engagement of the clutch and reaches the creep reference speed, which is lower than the engine target idle speed by the marginal speed a, the controller disengages the clutch so as to maintain the creep driving speed of the vehicle.

Here, the marginal speed a for deciding the creep reference speed is a speed value that is suitably set depending on a manufacturer's strategy for creep driving of the specific vehicle.

As illustrated in FIG. 2, after the controller initiates the control process, when it is determined that the speed of the input shaft is equal to or larger than the creep reference speed, the controller performs the limit release step (S20), and when it is determined that the speed of the input shaft is lower than the creep reference speed, the controller performs the limit-setting step (S10). In the state in which the minimum creep torque is set to 0 in the limit release step (S20), when the speed of the input shaft is decreased below the creep reference speed, the controller performs the limit-setting step (S10). As also described above, in the state in which the minimum creep torque is set to be the lower limit torque in the limit-setting step (S10), when the speed of the input shaft is increased above the creep reference speed, the controller performs the limit release step (S20). As such, when the control process of the controller is initiated, any one of the limit-setting step (S10) and the limit release step (S20) is first performed, and subsequently the limit-setting step (S10) and the limit release step (S20) are alternately performed depending on the change in the speed of the input shaft.

In the limit release step (S20), when the speed of the input shaft of the transmission is increased above the creep reference speed, the controller sets the creep minimum torque to 0 in order to reduce the vehicle speed to the utmost and to maintain the creep driving state of the vehicle, thereby disengaging the clutch by moving the same back from the touch point and preventing or inhibiting any driving torque from being transmitted to the driving wheels.

Of course, even when the creep minimum torque is set to 0 in the limit release step (S20), driver's tip-in manipulation may occur. This case may be regarded as a situation in which the vehicle speed is higher than that in the case in which the creep minimum torque is set to be the lower limit torque in the limit-setting step (S10). In this situation, the clutch is controlled to be engaged relatively slowly so as not to deteriorate the driver's sense of acceleration when the driver accelerates the vehicle. Accordingly, a proper clutch engagement time for inhibiting or preventing a shock, which is caused when the clutch moves through the touch point, may be secured.

That is, even when driver's tip-in manipulation occurs while the creep driving is being performed on the basis of the creep minimum torque, which is set to be larger than 0 in the limit-setting step (S10), because the clutch is already in the state of being engaged beyond the touch point, the generation of a shock, which is caused when the clutch moves through the touch point, may be inhibited or prevented, and acceleration response may be improved due to rapid engagement of the clutch.

Figure 3:
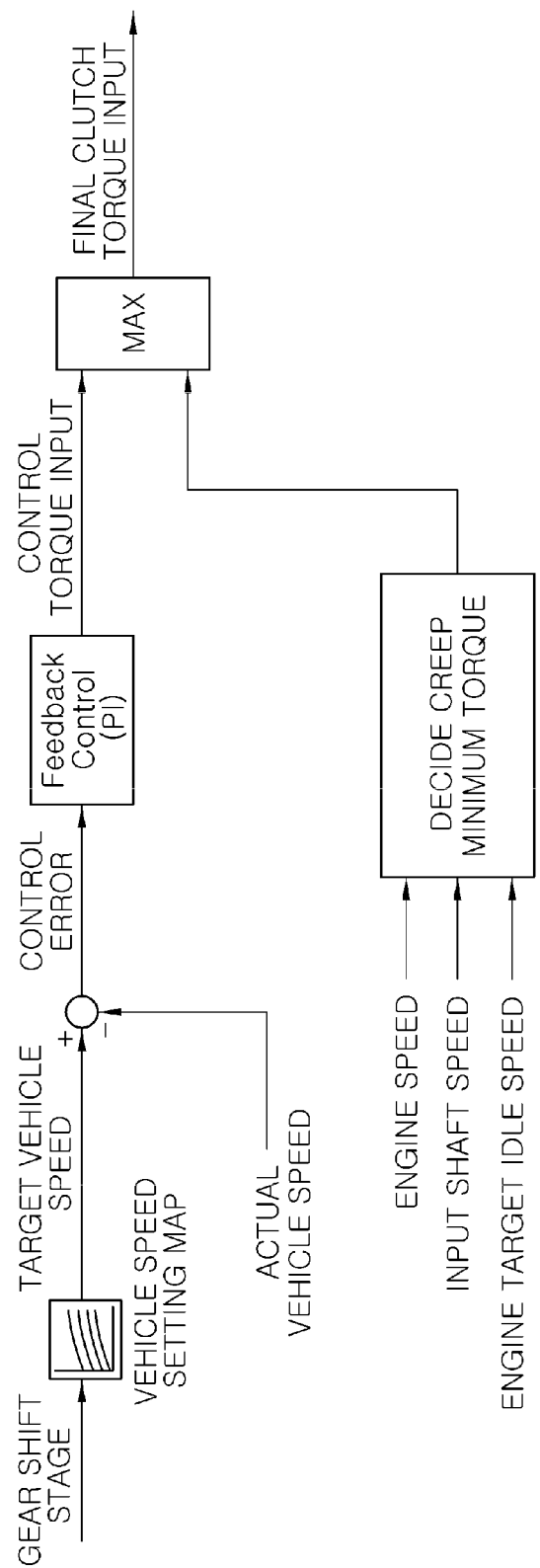
FIG. 3 is a block diagram explaining the process of calculating a final clutch torque input to be used for controlling the clutch according to the present disclosure.

FIG. 3 is a block diagram explaining the process of calculating a final clutch torque input to be used for controlling the clutch according to the present disclosure, which illustrates that a control method according to the present disclosure is added to a conventional control method, which includes calculating a creep target vehicle speed from a vehicle speed setting map according to a current gear shift stage of the transmission, calculating a control error by comparing the creep target vehicle speed with the actual vehicle speed, calculating a control torque input through feedback control (PI), and obtaining a final clutch torque input for controlling the clutch from the control torque input.

The control method according to the present disclosure further includes deciding a creep minimum torque, which is limited in the above-described limit-setting step or limit release step on the basis of an engine speed, a speed of the input shaft and an engine target idle speed, comparing the creep minimum torque with the control torque input, calculated according to the above-described conventional control method, and using the maximum value of the two as the final clutch torque input for controlling the clutch.

As an example, when the control torque input calculated according to the conventional control method is lower than the creep minimum torque, which is set to be the lower limit torque in the limit-setting step of the present disclosure, the clutch is controlled based on the lower limit torque. Since the clutch is in the state of being engaged beyond the touch point, the present disclosure has the effects of being capable of inhibiting or preventing a shock and improving acceleration response at the time of a driver's tip-in manipulation, as described above.

Figure 4:
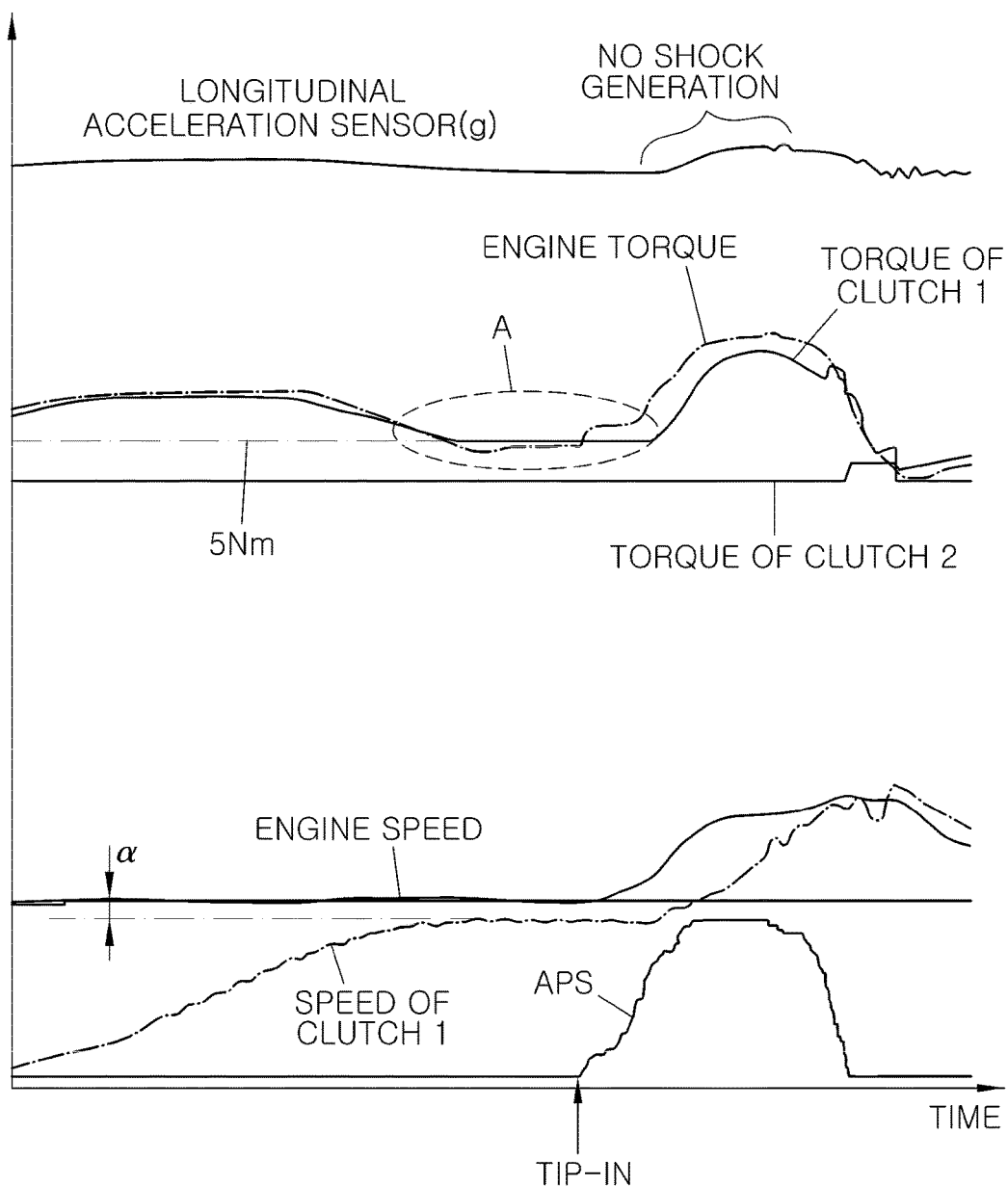
FIG. 4 is a graph explaining the effects of the present disclosure.

FIG. 4 is a graph explaining the effects of the present disclosure. As illustrated in FIG. 4, in the state in which the creep minimum torque is controlled to be a certain lower limit torque, for example, approximately 5 Nm (indicated by "A"), even when the signal value from the APS is increased due to the driver's tip-in manipulation, the value g of the longitudinal acceleration sensor of the vehicle is not changed sharply, which means that a shock is not generated.

In addition, another form of the creep control method according to the present disclosure includes: a limit-setting step (S10), in which, if the controller determines that the vehicle speed is lower than the creep target vehicle speed, the creep minimum torque is set to be a predetermined lower limit torque, which is larger than 0; and a limit release step (S20), in which, if the controller determines that the vehicle speed is increased above the creep target vehicle speed while the creep minimum torque is limited to the lower limit torque, the creep minimum torque is set to 0.

Of course, the lower limit torque in the limit-setting step (S10) is set to be in the range larger than 0 but incapable of accelerating the vehicle on level ground.

That is, the limit-setting step (S10) and the limit release step (S20) in this form are performed by comparing the vehicle speed with the creep target vehicle speed through the controller, rather than comparing the speed of the input shaft of the transmission with the creep reference speed. The remaining control process in this form is substantially the same as that in the previous form.

As is apparent from the above description, the present disclosure provides a creep control method for a vehicle, which is capable of reducing or inhibiting the generation of a shock attributable to the clutch and improving acceleration response of the vehicle at the time of a driver's tip-in manipulation during creep driving of the vehicle.

Although the forms of the present disclosure have been disclosed for illustrative purposes, those skilled in the art will appreciate that various modifications, additions and substitutions are possible, without departing from the scope and spirit of the present disclosure.

What is claimed is:

1. A creep control method for a vehicle, comprising:
   comparing a speed of an input shaft of a transmission with a predetermined creep reference speed through a controller, and, upon determining that the speed of the input shaft is lower than the creep reference speed, setting a creep minimum torque of a clutch for controlling creep driving of the vehicle to be a predetermined lower limit torque, the predetermined lower limit torque being larger than 0; and
   upon determining that the speed of the input shaft is increased above the creep reference speed while the creep minimum torque is limited to the predetermined lower limit torque, setting the creep minimum torque to 0.

2. The creep control method according to claim 1, wherein the predetermined lower limit torque is set to be in a range larger than 0 but incapable of accelerating the vehicle on level ground.

3. The creep control method according to claim 1, wherein, when the controller initiates a control process, upon determining that the speed of the input shaft is equal to or larger than the creep reference speed, the controller performs the setting the creep minimum torque to 0, and upon determining that the speed of the input shaft is lower than the creep reference speed, the controller performs the setting the creep minimum torque to be the predetermined lower limit torque, and
   upon determining that the speed of the input shaft is decreased below the creep reference speed while the creep minimum torque is set to 0, the controller performs the setting the creep minimum torque to be the predetermined lower limit torque.

4. The creep control method according to claim 1, wherein the creep reference speed is set by subtracting a predetermined marginal speed from an engine target idle speed.

5. A creep control method for a vehicle, comprising:
   upon determining that a vehicle speed is lower than a creep target vehicle speed through a controller, setting a creep minimum torque of a clutch for controlling creep driving of the vehicle to be a predetermined lower limit torque, the predetermined lower limit torque being larger than 0; and
   upon determining that the vehicle speed is increased above the creep target vehicle speed through the controller while the creep minimum torque is limited to the predetermined lower limit torque, setting the creep minimum torque to 0.

6. The creep control method according to claim 5, wherein the predetermined lower limit torque is set to be in a range larger than 0 but incapable of accelerating the vehicle on level ground.

* * * * *